United States Patent [19]

Bhate et al.

[11] 4,304,632

[45] Dec. 8, 1981

[54] NUCLEAR REACTOR SHUTDOWN SYSTEM

[75] Inventors: Suresh K. Bhate, Niskayuna, N.Y.; Martin H. Cooper, Monroeville, Pa.; Delmar R. Riffe, Murrysville, Pa.; Calvin L. Kinney, Penn Hills, Pa.

[73] Assignee: Westinghouse Electric Corp., Pittsburgh, Pa.

[21] Appl. No.: 67,989

[22] Filed: Aug. 20, 1979

[51] Int. Cl.$^3$ .................................................. G21C 7/14
[52] U.S. Cl. ...................................... 376/336; 376/233
[58] Field of Search ...................... 176/22, 36 K, 86 R, 176/DIG. 5

[56] References Cited

U.S. PATENT DOCUMENTS

| | | | |
|---|---|---|---|
| 3,050,943 | 8/1962 | Thorel et al. | 176/36 R |
| 3,976,540 | 8/1976 | Sowa | 176/DIG. 5 |
| 3,976,543 | 8/1976 | Sowa | 176/DIG. 5 |
| 3,992,257 | 11/1976 | van Erp et al. | 176/DIG. 5 |

FOREIGN PATENT DOCUMENTS

| | | | |
|---|---|---|---|
| 857432 | 12/1960 | United Kingdom | 176/86 R |
| 890661 | 3/1962 | United Kingdom | 176/22 |

*Primary Examiner*—Sal Cangialosi
*Attorney, Agent, or Firm*—Edward L. Levine; Z. L. Dermer

[57] ABSTRACT

An inherent shutdown system for a nuclear reactor having neutron absorbing rods affixed to an armature which is held in an upper position by a magnetic flux flowing through a Curie temperature material. The Curie temperature material is fixedly positioned about the exterior of an inner duct in an annular region through which reactor coolant flows. Elongated fuel rods extending from within the core upwardly toward the Curie temperature material are preferably disposed within the annular region. Upon abnormal conditions which result in high neutron flux and coolant temperature, the Curie material loses its magnetic permeability, breaking the magnetic flux path and allowing the armature and absorber rods to drop into the core, thus shutting down the fissioning reaction. The armature and absorber rods are retrieved by lowering the housing for the electromagnet forming coils which create a magnetic flux path which includes the inner duct wall. The coil housing then is raised, resetting the armature.

10 Claims, 6 Drawing Figures

NUCLEAR REACTOR SHUTDOWN SYSTEM

The invention described herein was made or conceived in the course of, or under, a contract with the U.S. Atomic Energy Commission, the U.S. Energy Research and Development Administration or the United States Department of Energy.

BACKGROUND OF THE INVENTION

1. Field of the Invention

This invention relates to control structures for nuclear reactors and more particularly provides an inherent shutdown system responsive to off-normal operational core characteristics.

2. Description of the Prior Art

The fissioning reaction within a nuclear core can be controlled by selective addition and removal of neutron absorbing material, typically in the form of absorber rods. Rapid shutdown of the reactor during off-normal operating conditions is important, and recent systems have been proposed which inherently respond to such conditions to drop or otherwise insert absorber rods into the core. Typical of such systems is that described in U.S. Pat. No. 3,976,540 which discloses an inherent shutdown system including a neutron absorbing mass held above a core through a magnetic flux. The magnetic flux circuit includes a ferromagnetic Curie point material which inherently responds to a selected high temperature so as to lower its magnetic permeability and break the magnetic circuit, thereby allowing the magnet and a fixed absorber mass to fall, under the force of gravity and a spring assist, into the core region. Curie temperature materials are well known which can be selected or alloyed to have a Curie point temperature.

While this and similar teachings appear to provide desired inherent shutdown capabilities, improvements can be made. For example, the discussed patent mixes coolant passing over fuel rods with cooling flowing through a vacant central region into which the absorber mass will drop. In the event of overtemperature conditions in the fuel rods, the coolant flowing about the fuel rods will heat up but be diluted by the cooler coolant flowing through the vacant region, thus slowing down the response time to reach the selected Curie temperature. Further, the teaching proposes lateral support of the magnet assembly and a fixed absorber mass which is dependent upon frictional characteristics and may thus require a larger holding force than otherwise necessary. The system additionally requires springs to laterally displace a portion of the holding structure to allow free fall of the absorber mass. The system also drops the magnet as well as the absorber mass into the core, exposing the magnet to a high and potentially damaging neutron flux upon insertion. Also, a mechanical manipulator is required to retrieve the magnet and absorber mass subsequent to insertion. And, relatively large surface area contact exists among the absorber mass and magnet and the structures which retain them in an upper position, potentially resulting in self-welding during normal operation which would defeat the insertion. Additionally, to test the system the Curie temperature material must be resistance heated. Alternatively, although not taught, if the magnet is an electromagnet allowing testing by cutting of the electrical power, the power leads will drop along the magnet, creating high mechanical loadings and exposing the leads to a high neutron flux and temperature upon insertion into the core.

It is thus desirable to provide an improved inherent shutdown system which alleviates these, and other deficiencies, in the present nuclear reactor inherent shutdown systems.

SUMMARY OF THE INVENTION

This invention provides an inherent shutdown system for nuclear reactors which improves upon present inherent shutdown system designs. In a preferred form the system includes a magnet, preferably coils hermetically sealed within a housing forming an electromagnet circuit. Matingly configured to abut a lower portion of the housing is an armature, the armature being affixed to a plurality of neutron absorber rods. An inner duct is spaced from and radially surrounds the rods and armature, and the rod and armature subassembly is, during normal power operation, positioned above the core region of the reactor. A number of fuel rods containing fissionable material, and preferably insulated, are preferably disposed about the inner duct in an annular region formed between the inner duct and an outer duct. The inner duct is comprised of a ferromagnetic material, such as $2\frac{1}{4}$ $C_r$–1 $M_o$ steel, except for a portion near its upper end which, when the absorber rods and armature are in an upper out of core position, is laterally aligned with a non-magnetic insert of the outer periphery of the armature.

Affixed to the outer periphery of the inner duct, across the non-magnetic portion of the duct, is a Curie temperature material which inherently responds to an increase in the temperature of reactor coolant which flows in the annular region about the fuel rods and the Curie temperature material. The response is a lowering of magnetic permeability to a preselected degree.

In the upper, above core configuration, the components are positioned so that a magnetic circuit is formed serially through the electromagnetic housing, the mating portion of the armature, across a controlled spatial gap to the Curie temperature material in the annular region, through the Curie material and again across the gap to another section of the armature and back to the housing. Thus, in the event that the coolant flowing about the inner duct reaches a preselected high temperature, the Curie temperature material reduces magnetic permeability and loses the capability of supporting the armature and absorber rods which rapidly drop, under the force of gravity, into the core region.

To retrieve and reset the absorber rods and armature the magnet coils, housing and electromagnet leads are controllably lowered within the inner duct until the housing and armature contact across their matingly configured surfaces. In this orientation the energized electromagnet creates a flux path similar to that described above except that instead of including the Curie temperature material the flux flows through the magnetic inner duct wall. The entire assembly can then be raised to its normal power operation position.

The system is easily tested, or rapidly actuated, merely by cutting power to the coils forming the electromagnet. Since the electrical leads remain positioned above the core with the electromagnetic coils, they are not exposed to the high temperature and flux conditions or the stresses associated with a rapid insertion. Further, the system is rapidly responsive to a high coolant temperature since only coolant in the annular region passes over the Curie temperature material, the cooler coolant flowing separately within the inner duct. Additionally, upon actuation the armature and absorber rods fall freely through the inner duct, into the core region, no other structures being positioned to interfere with this motion.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1:
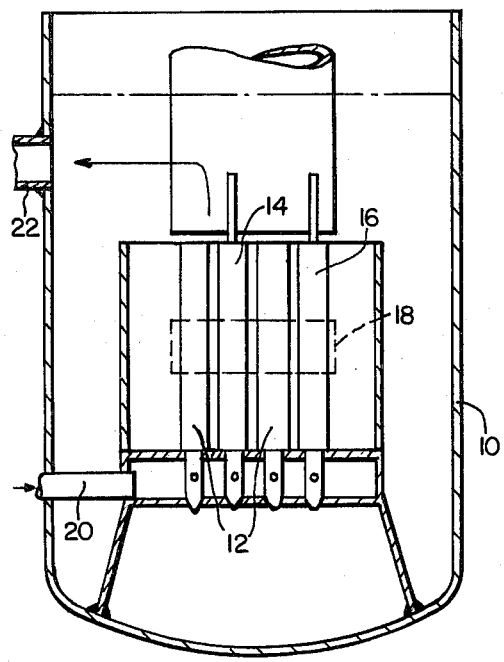
FIG. 1 is a simplified schematic of a portion of a typical nuclear reactor.

Referring now to FIG. 1 there is shown the lower portion of a typical nuclear reactor including a vessel 10 housing a plurality of assemblies including fuel assemblies 12, control assemblies 14, and shutdown assemblies 16. Fissionable fuel is contained in fuel assemblies in a core region 18 represented by the dotted line. A coolant, for example liquid sodium in the case of a breeder reactor which typically includes fertile fuel about the core region, enters the vessel 10 through inlet 20, flows upwardly through the various assemblies absorbing heat energy, and is discharged to heat transfer apparatus (not shown) such as through outlet 22 typically for the ultimate purpose of electric power generation.

The reactor power output can be controlled in several fashions, including variation of coolant flow rate, selective positioning of portions of the control assemblies 14 containing neutron absorbing material, and full in core or full out of core positioning of the portion of the shutdown assemblies 16 containing absorbing material.

Figure 2A:
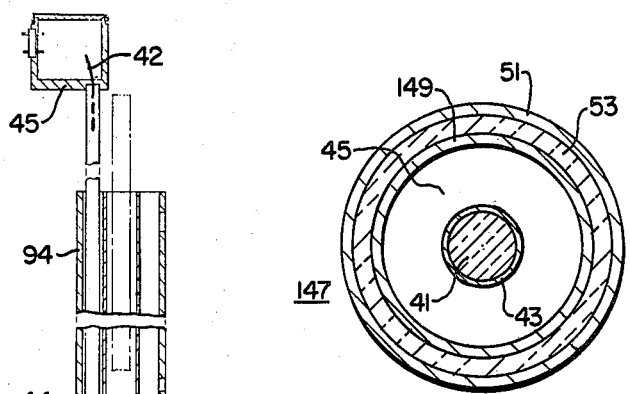
FIG. 2A is a section view taken at IIA—IIA of FIG. 2.
Figure 2:
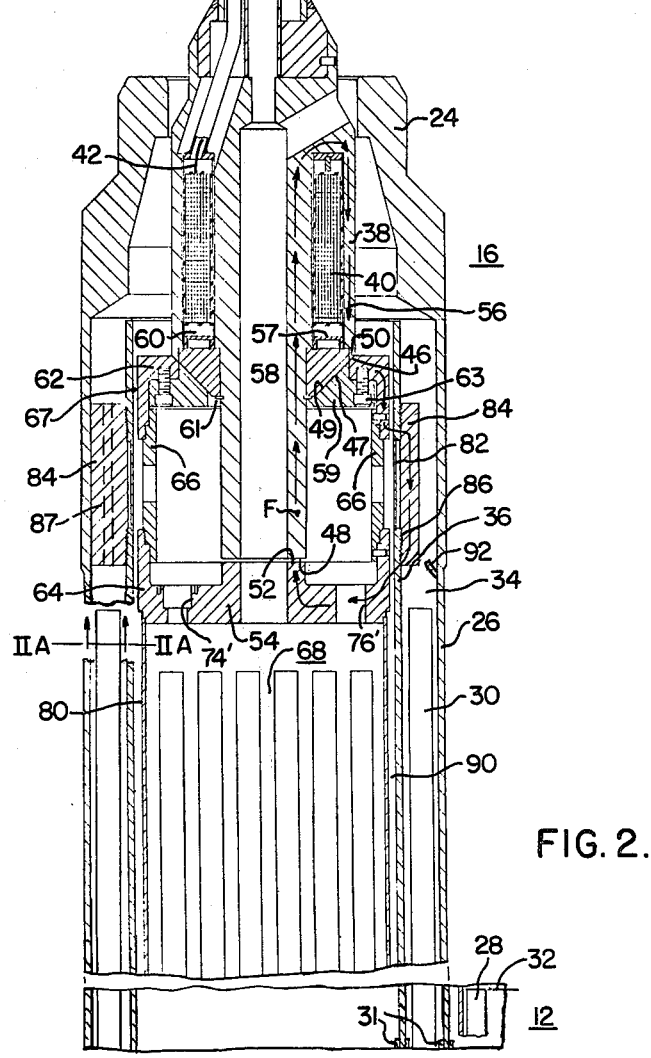
FIG. 2 is an elevation view, in cross section, of an inherent shutdown system for a nuclear reactor in accordance with the invention, the components being positioned in an upper orientation.

FIG. 2 shows additional detail of an inherent shutdown assembly 16 in accordance with the invention, inherent features characterized as those requiring no external actuating instrumentation and whose response cannot be prevented by a plant operator or other plant protection system malfunction.

The assembly 16 includes a housing 24, fixed in position. The housing 24 is generally hexagonal in accordance with the specific embodiment shown, although it is to be understood that the general configuration of the housing 24 and other components herein described can easily be varied in accordance with any specific core 18 and reactor arrangement. The housing includes an outer duct 26 which extends through the core region and which is typically bounded radially within the core by fuel assemblies 12 containing conventional fissionable fuel rods 28. The fuel rods can also include fertile breeder material above and below the core region, as is well known. Located at, for example, each of the six corners of the hexagonal outer duct 26 is a shutdown assembly fissionable fuel rod 30 which extends from within the core region upwardly to an elevation above the top 32 of the fissionable core region 18. The shutdown fuel rods 30 are disposed within an annular region 34 formed between the outer duct 26 and an inner duct 36. The inner duct 36 is affixed to the outer duct 26, preferably at their lower extremities as indicated by clips 31.

The shutdown fuel rod 30 and associated structure is shown in additional detail in FIG. 2A. It includes a fissionable fuel 41 hermetically sealed within a metallic cladding 43. Spaced from the cladding 43 so as to form a coolant flow annulus 45 is an insulation subassembly 147. In preferred form the sub-assembly 147 includes two metallic tubes 149, 51 with thermal insulation 53 such as MgO or $ZrO_2$ disposed therebetween. In this manner hot coolant flowing in annulus 45 is segregated from other coolant flow paths.

Figure 3:
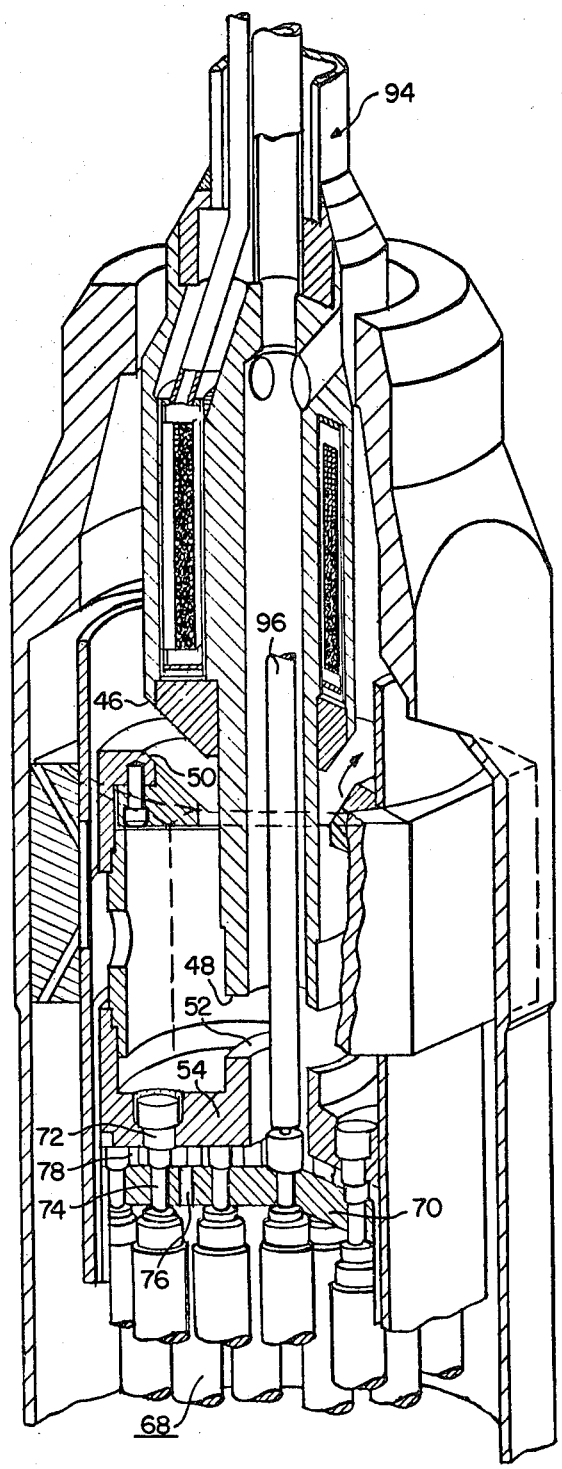
FIG. 3 is a perspective view, also in cross section, of the system of FIG. 2, showing additional detail, certain components shown positioned in a slightly lower than full up orientation.

Movably supported within the housing 24 is a generally cylindrical enclosure 38 which hermetically contains a permanent magnet or, preferably, coils 40 which form an electromagnet. Electrical leads 42 are sealingly attached to the coils 40 through a conduit 44 which terminates at a junction 45. The enclosure 38 includes a surface 46 and a surface 48 which are configured to matingly abut corresponding surfaces 50 and 52 of an armature 54 (FIGS. 2 and 3). Depending upon the manufacturing tolerance, the surfaces 46 and 50 may abut while the surfaces 48 and 52 are spaced slightly, on the order of 0.005 inch. The mating surfaces are sized to allow transference across the abutting surfaces 46, 48, 50, 52 of a preselected magnetic flux, indicated by arrows 56. The surfaces 46 and 50 are preferably slanted, as shown, to facilitate alignment. Alignment is further facilitated by the slanted surfaces 47, 49 on non-magnetic plugs 58 and 59 affixed respectively to the enclosure 38 and armature 54. The plugs 58, 59 are preferably comprised of stainless steel and plug 58, which, coupled with an insert 57, supports the coils 40 within a cavity 60, is held in position by snap ring 61 and can additionally include welds. Plug 59 is affixed to the armature 54 by bolts 63, and can also be welded.

The armature 54 is generally cylindrical including an upper segment 62 and a lower segment 64, both of which are comprised of a ferromagnetic material. The segments 62, 64 are joined by a non-magnetic insert 66 and are radially spaced from the inside of the inner duct by a selected spatial gap 67, on the order of 0.1 inch, which is sufficient to assure that the armature 54 and the components affixed thereto will drop freely, without binding or self-winding, upon release as described hereinafter.

Affixed to the armature 54 are a plurality of neutron absorbing rods 68. The rods 68 can be affixed in many manners, a preferred form being shown in FIG. 3. This support structure includes a plate 70 which is spaced from and affixed to the armature 54 by bolts 72. The plate 70 includes not only passages 74 utilized for joining the components, but also passages 76 through which coolant flows into a flow space 78. The armature 54 is provided with similar passages 74' and 76' (FIG. 2). The absorber rods are preferably swaged into the plate 70 to form a single assembly. As the rods 68 are long, on the order of six feet, preferably a cylindrical casing 80

(FIG. 2) radially surrounds the rods 68 and is affixed to the armature 54, such as by welding, so that upon dropping of the armature and rods into the core region the rods do not contact any fixed structure which could otherwise impede a rapid drop.

Figure 4:
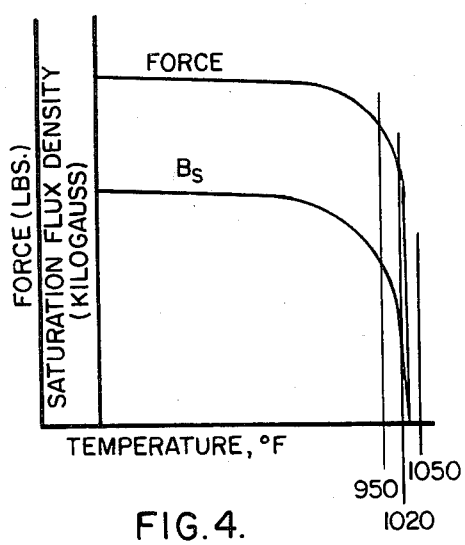
FIG. 4 is a graph showing qualitatively the well known effect of temperature (°F.) on both the saturation flux density (kilogauss) and the resultant holding force for an exemplary system.

The inner duct 36 includes a non-magnetic segment such as that formed by a thin cylinder 82. As shown in FIG. 2, when the components are positioned in an upper orientation the non-magnetic cylinder 82 is radially aligned with the non-magnetic insert 66 of the armature 54. Positioned about the non-magnetic cylinder 82 segment of the inner duct 36, within the annular region 34, is a Curie temperature material assembly 84. The Curie temperature material assembly 84 is hexagonal in the embodiment shown and preferably is affixed to the inner duct 36 through threads 86 and pins (not shown). The material 84 can also be provided with flow holes 87 through which coolant flows. The Curie temperature material 84 is selected to provide a holding magnetic permeability up to a preselected temperature, for example, up to 1022° F., and to lose its permeability and magnetic holding capacity above a preselected temperature, for example at 1050° F. Curie temperature materials which exhibit such properties are well known, such as those comprised of nickel-iron alloys. A typical response curve for this material is shown in FIG. 4.

Operation of the shutdown system 16 will now be described. Referring again to FIG. 2 which shows the shutdown system in an upper or armed configuration, energization of the coils 40 creates the magnetic holding flux represented by the arrows 56. Beginning at the point marked "F" at the lower central portion of the enclosure 38, the flux is upward and over and about the coils 40. Short-circuiting below the coils 40 is prevented by the absence of any magnetic material in this region, the plugs 58, 59 and insert 57 being non-magnetic. The flux is then across the mating holding surfaces 46 and 50 and into the upper segment 62 of the armature 54. The flux is prevented from traversing directly to the lower segment 64 of the armature 54 by the absence of any magnetic material, the insert 66 being non-magnetic, and thus passes across the gap 67 and into the Curie temperature material 84. With the Curie material 84 at a low temperature, the flux path traverses the material 84 and flows back across the gap 67 to the lower segment 64 of the armature 54. The flux then flows through the lower portion of the lower segment 64 and across mating holding surfaces 48 and 52, completing the circuit. It can be seen that this flux path retains the armature and affixed absorber rods 68 in an upper position, the bottom of the absorber rod 68 being above the core region 18.

It will also be evident that there are two prime coolant flow paths upwardly within the outer duct 26. The first path is coolant which flows within the inner duct 36 and includes a small portion within an annulus 90 formed between the inner surface of the inner duct and the outer surface of the casing 80, as well as a large portion flowing about the absorber rods 68. This coolant flows through and about the armature 54 and is discharged at the top of the inner duct 36 and at the top of the enclosure 38. In an exemplary liquid sodium cooled nuclear fast breeder reactor this coolant is at a temperature of approximately 750° F. The second prime coolant flow path is within the annular region 34 and over the Curie temperature material 84. Because the shutdown assembly fuel rods 30 are generating heat through fissioning, this coolant, particularly that portion flowing through the annulus 45 (FIG. 2A), is at a normal operating temperature of approximately 950° F. in the exemplary reactor. This hotter coolant flows about the Curie material 84, which correspondingly operates at about 950° F. Deflecting vanes 92 are preferably utilized to direct coolant from about the fuel rods 30 toward the Curie material 84. The coolant flowing in the annular region 34 does not mix with coolant flowing within the inner duct 36 until it reaches an elevation above the Curie material assembly.

In the event of an abnormal operating condition within the core region 18, such as excessively high temperature or particularly, high neutron flux, the coolant flowing in annular region 34, and particularly the coolant in annulus 45, will be rapidly heated by fissioning of the rods 30, thereby raising the temperature of the Curie material 84, lowering its magnetic permeability, breaking the flux path and releasing the holding capacity of the system. Thus the armature 54, absorber rods 68, casing 80 and other affixed structures drop, by the force of gravity, toward and into the core region. FIG. 3 shows the position of the armature 54 and absorber rods 68 near the beginning of the fall, separation occurring at surfaces 46, 48, 50 and 52. Appropriate stops, well known, stop the fall when the absorber rods are within the core region 18. An indicator rod 96 can be utilized to indicate the position of the absorber assembly.

Figure 5:
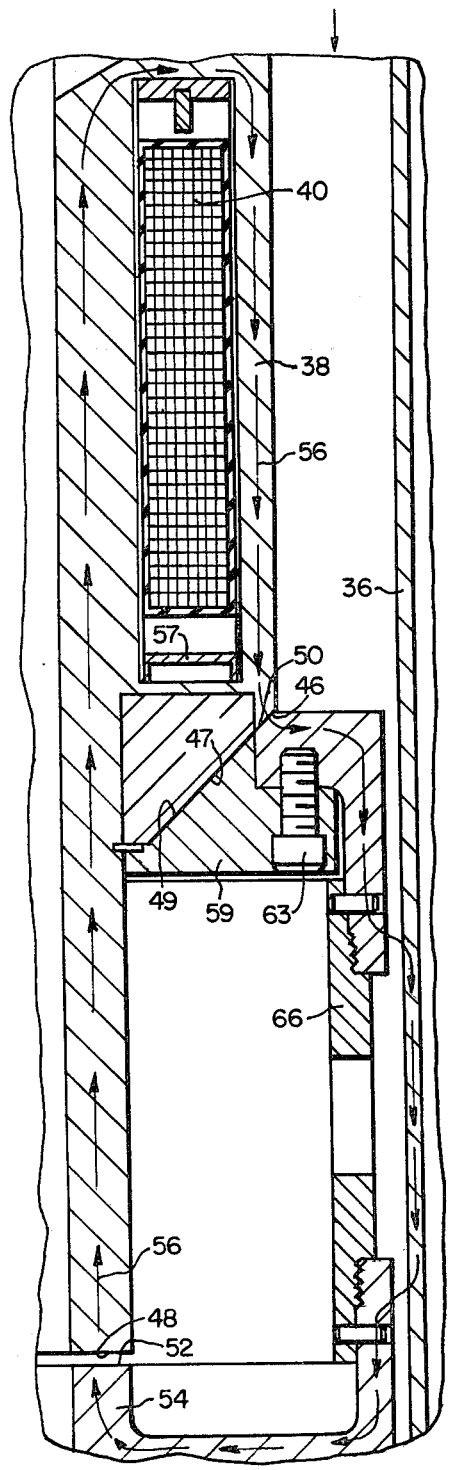
FIG. 5 is a sectional elevation view, similar to FIG. 2, showing the components in a lower orientation.

To retrieve the armature 54 and absorber rods 68 when the core is in proper condition and the neutron flux and temperature are reduced, the enclosure 38 and the coils 40 are controllably lowered, through lowering of shaft 94, until the surfaces 46/50 and 48/52 mate. Upon energizing the coils 40, as shown in FIG. 5, the flux path 56 is similar to that described above except that it flows through the magnetic inner duct 36 wall instead of through the Curie material 84. The magnetic holding capacity is thus restored and, upon lifting of shaft 94, the armature 54 and absorber 68 are returned to the upper, out of core position.

It will also be apparent that in addition to the inherent operation described, the absorber rods can be inserted into the core by cutting power to the coils. It will be further apparent that the shutdown system will rapidly respond, although not as rapidly, to an undesirable increase in the temperature of coolant exiting the core region even without utilization of the shutdown assembly fuel rods 30.

Since numerous changes may be made in the described apparatus without departing from the spirit and scope thereof, it is intended that all matter contained in the foregoing description and shown in the drawings be interpreted as illustrative and not in a limiting sense.

We claim:

1. A nuclear reactor inherent shutdown system comprising an annular region formed between an inner duct and an outer duct, means, disposed at least partially within an envelope formed by said inner duct and lineal extensions thereof, for creating a magnetic field, a neutron absorber assembly having a movable absorber disposed within said inner duct and said movable absorber being releasably coupled by a magnetic circuit to structure so as to position said movable absorber above a core region and being decoupled so as to drop said absorber downwardly into said core region through lowering of the magnetic permeability of a Curie point material assembly, said inner duct having a ferromagnetic portion and a non-magnetic portion, said Curie point material assembly being annular and fixedly disposed within said annular region and positioned about said non-magnetic portion of said inner duct.

2. The reactor of claim 1 wherein said magnetic circuit is formed by coils sealed within a housing and further comprising means for positioning said coils above said core region and for selectively lowering said coil housing toward said core region independently of said movable absorber so that upon energizing of said coils in said lowered position a magnetic flux passes through said inner ferromagnetic portion of said duct, thereby recoupling said coil housing and absorber.

3. The reactor of claim 1 wherein the magnetic flux coupling said movable absorber to said structure passes through a controlled clearance gap.

4. The reactor of claim 1 further comprising fissionable material located within said annular region such that a lower temperature coolant flows upwardly within said inner duct and a higher temperature coolant flows upwardly within said annular region and about said Curie temperature material.

5. The reactor of claim 4 wherein said fissionable material extends upwardly from within said core region.

6. The reactor of claim 4 further comprising means for insulating said fissionable material, said means being spaced from said fissionable material so as to form an annulus about said fissionable material for coolant flow.

7. An inherent shutdown system for a core of a nuclear reactor circulating a liquid coolant comprising
   a. an outer duct;
   b. an inner duct fixed relative to said outer duct, said inner duct being spaced from said outer duct so as to form annulus therebetween;
   c. a neutron absorber movably disposed within said inner duct;
   d. an armature affixed to said absorber rods;
   e. an enclosure disposed at least partially within said outer duct, said enclosure being selectively movable within said inner duct;
   f. a preselected Curie temperature material disposed within said annulus;
   g. means for creating a magnetic circuit through said armature and enclosure, and selectively through said Curie temperature material; and
   h. fissionable material extending upwardly from within said core, said fissionable material being disposed within said annulus;
   i. whereby coolant flowing within said annulus, about said fissionable material, and about said Curie temperature material is segregated from coolant flowing within said inner duct throughout the length of said annulus.

8. The system of claim 7 wherein said armature and absorber rods are spaced from said inner duct, said magnetic circuit passing across said space.

9. The system of claim 8 wherein a portion of said inner duct is comprised of a ferromagnetic material and another portion is comprised of a non-magnetic material, whereby upon disposition of said armature and enclosure adjacent said ferromagnetic portion, said magnetic circuit passes through said armature, enclosure and said magnetic portion of said inner duct.

10. The system of claim 7 wherein said armature comprises an upper segment and a lower segment, said segments being comprised of a ferromagnetic material and disposed adjacent said inner duct, said segments being separated by a non-magnetic insert, wherein said inner duct comprises a portion comprised of a ferromagnetic material and a portion comprised of a non-magnetic material, said non-magnetic insert being selectively positionable adjacent said non-magnetic portion of said inner duct, and wherein said Curie temperature material is affixed to said inner duct adjacent said non-magnetic portion of said inner duct, whereby upon selective adjacent alignment of said insert and said Curie material and non-magnet portion of said duct, said magnetic circuit passes serially from said upper segment, through said Curie material, to said lower segment.

* * * * *